United States Patent Office 3,649,522
Patented Mar. 14, 1972

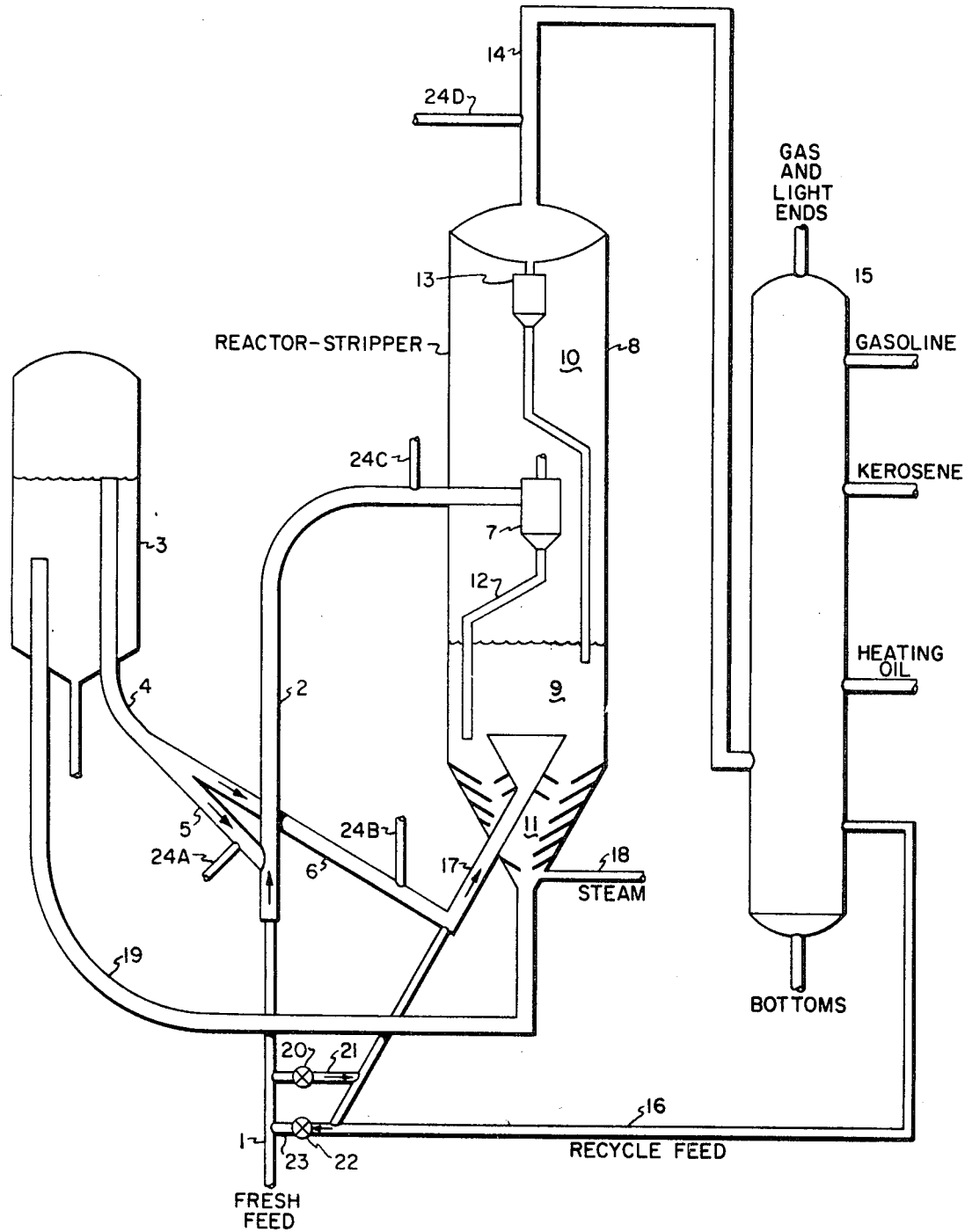

3,649,522
TRANSFERLINE FLUID CRACKING PROCESS EMPLOYING CONVENTIONAL CRACKING CATALYST AND SUPERACTIVE MOLECULAR SIEVE CRACKING CATALYST
Homer Z. Martin, Westfield, N.J., assignor to Esso Research and Engineering Company, Linden, N.J.
Filed Sept. 19, 1969, Ser. No. 860,852
Int. Cl. C10g 11/18
U.S. Cl. 208—120          12 Claims

ABSTRACT OF THE DISCLOSURE

Conversion of a petroleum hydrocarbon fraction in a fluid catalytic cracking process which includes cracking in at least one transferline reactor utilizing a conventional fluid cracking catalyst and a second catalyst comprising a pure superactive crystalline aluminosilicate zeolite material having a particle size of less than about 10 microns.

---

Transferline fluid catalytic cracking is a mode of fluid catalytic cracking petroleum hydrocarbons in which a finely divided cracking catalyst is formed into a suspension with a petroleum hydrocarbon fraction which is in essentially the vapor phase. In a typical embodiment of transferline cracking the suspension flows at a gas velocity in the range between about 8 and 50 feet per second through an elongated reaction zone having a length-to-diameter ratio in the range from about 4:1 to about 20:1. A sufficient amount of catalyst is maintained in suspension to provide a weight ratio of feed per hour to catalyst in the reaction zone in the range of from about 20:1 to about 300:1. The catalyst density in a typical transferline or riser fluid catalytic cracking reactor ranges from 1.0 to 10.0 pounds per cubic foot.

Transferline reactors can be employed to provide substantially all of the conversion of a petroleum fraction or they can be used in conjunction with a conventional dense bed of fluidized cracking catalyst. Transferline fluid catalyst cracking systems are disclosed in U.S. Pat. No. 2,881,129; U.S. Pat. No. 2,895,901; U.S. Pat. No. 2,902,432; U.S. Pat. No. 3,123,547 and U.S. Pat. No. 3,355,380. The 3,123,547 patent and the 3,355,380 patent disclose the combination of transferline cracking and dense bed fluid cracking as well as the concept of segregated cracking of different feedstock fractions.

Transferline cracking reactors are increasingly of interest to refiners because they feature short oil and catalyst residence times which enable active catalysts to provide high conversions of cracking feed to hydrocarbons boiling in the gasoline boiling range without excessive deposition of coke on the catalyst. This is particularly true in the case of the crystalline aluminosilicate zeolite fluid cracking catalyst. Transferline reactors are also characterized by good mixing of feed and catalyst and by a lower system catalyst inventory due to more efficient use of catalyst.

In modern refinery practice it is necessary that the catalytic cracker have maximum flexibility to enable the refiner to adjust product quality and quantity in response to changes in demand. The transferline cracking technique is a versatile tool for meeting product demands; however, it is the object of this invention to provide an added degree of flexibility to the process. The present invention provides a means of augmenting or varying conversion in an existing or grass roots fluid cracking unit which has at least one transferline reactor.

Briefly stated, the invention comprises a process of carrying out fluid catalytic cracking in a cracking unit having at least one transferline reactor in the presence of two cracking catalysts, e.g., conventional fluid cracking catalyst and pure unencapsulated aluminosilicate molecular sieve cracking catalyst. Further details of the invention are set forth below. The drawing is a flow sheet disclosing a preferred embodiment of the invention.

As it is used in this specification, the term conventional cracking catalyst means amorphous silica-type fluid cracking catalyst as well as the newer crystalline aluminosilicate zeolites which are physically combined or encapsulated with amorphous catalyst, with clays or with some other host material to provide fluidizable catalyst particles.

Amorphous silica-alumina, silica-magnesia and silica-zirconia fluid cracking catalysts have been in commercial use for many years. In general they are prepared by (1) coprecipitation or cogelation of silica and alumina from mixed solutions of sodium silicate and aluminum sulfate, or (2) formation of silica hydrogel by reaction of sodium silicate with sulfuric acid, followed by incorporation of alumina, for example by addition of aluminum sulfate and ammonia. The composite is then water-washed and dried. Commercial amorphous silica-alumina fluid cracking catalysts have an average particle size in the range of 40 to 100 microns.

Cracking clays have also been in use for over twenty-five years. Naturally occurring clays such as bentonite, kaolin and halloysite are chemically treated to render them active for catalytic cracking. They are then shaped into particles suitable for fluidization and circulation in a fluid cracking unit.

Numerous preparations of typical conventional silica-alumina and clay cracking catalysts are described by Ryland et al., Catalysis, vol. VII, 1960, pp. 1–86, and by references cited therein.

The improved process of the invention also applies to transferline-type fluid cracking processes utilizing molecular sieve fluid cracking catalysts. Because of the extremely small size and high activity of sieves, they are not used in the pure form in regenerative fluid catalytic cracking processes. They are employed in a matrix or encapsulated with amorphous silica-alumina catalyst and/or clay. In this form the zeolite-containing catalyst is in the form of a fluidizable particle and it can be controlled in cracking activity. The particle size ranges from about 40 to about 100 microns.

In general the chemical formula of the anhydrous crystalline aluminosilicate zeolite, employed in the present invention, expressed in terms of moles may be represented as:

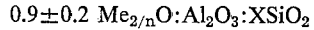

wherein Me is selected from the group consisting of metal cations, hydrogen and ammonia, $n$ is its valence and X is a number above 3, e.g., 4 to 14, preferably 4.5 to 6.5. The crystalline aluminosilicate zeolites include synthetic crystalline aluminosilicates, naturally occurring crystalline aluminosilicates and caustic treated aged clays in which a portion of the clay has been converted to crystalline zeolite. Synthetic materials include faujasites and mordenites. Natural materials are erionite, analcite, faujasite, phillipsite, clinoptilolite, chabazite, gmelinite and mordenite and mixtures thereof. Montmorillonite and kaolin clays can be treated to obtain crystalline aluminosilicates.

All or a portion of the cations of the zeolites such as sodium cations can be replaced with hydrogen ions, ammonium ions or metal cations such as rare earth, manganese, cobalt, zinc and other metals of Groups I to VIII of the Periodic Table.

Preparations of matrix type fluid cracking catalysts are disclosed in U.S. Pat. No. 3,329,628, U.S. Pat. No. 3,352,796, U.S. Pat. No. 3,410,808, and U.S. Pat. No. 3,140,249. In this type of catalyst the zeolite crystals are coated with or encapsulated in a siliceous gel. The matrix type catalyst contains 5 to 50%, preferably 5 to 20%, crystalline zeolite.

Certain natural clay minerals can be treated to convert a portion of the material to crystalline zeolite. Clays such as kaolin, kaolinite, halloysite, bentonite and other siliceous clays have been treated in this manner as disclosed in U.S. Pat. No. 3,037,843, U.S. Pat. No. 3,065,054 and U.S. Pat. No. 3,458,454, for example. The treated clays contain 5 to 50% crystalline zeolite.

The auxiliary or second catalyst is a substantially pure unencapsulated crystalline zeolite containing 70 to 100% crystalline zeolite and it has an average particle size of less than 10 microns, preferably less than 5 microns. The most preferred particle size is in the range of .1 to 2 microns. The pure zeolite is used in very small amounts in the process to augment the cracking effected by the fluid conventional catalyst. In the preferred embodiment the pure sieve catalyst is used on a once-through basis and no attempt is made to recover and regenerate the pure zeolite catalyst.

Referring to the drawing, reference numeral 1 designates a line providing fresh petroleum hydrocarbon feed to a transferline reaction zone 2. Suitable process feeds include fractions boiling in the range of 200° to 1200° F. derived from atmospheric distillation, deasphalting, vacuum distillation, coking, visbreaking, solvent extraction, mixed fractions, etc. The fraction known as gas oil is a preferred feed. The oil fed to the process is usually heated to a suitable temperature in the range of 300° to 900° F. and it preferably passes through line 2 in the vapor phase or in mixed phase wherein the major proportion of the feed, i.e., 60 to 99%, is in the vapor phase.

The feed is mixed with hot catalyst withdrawn from regenerator 3 by line 4. In this particular embodiment line 4 is divided into two lines 5 and 6 by a suitable valving arrangement (not shown) to provide for segregated cracking of fresh feed and recycle feed. A mixture of catalyst from line 5 and feed from line 1 is catalytically cracked in line 2 at transferline conditions. Preferred conditions include temperatures in the range of 500° to 1000° F., pressures in the range of 1 to 50 p.s.i.g., a gas velocity in the range of 8 to 50 feet/second, a catalyst density in the range of 1 to 10 lb./ft.$^3$ and a weight ratio of feed to catalyst in the range of 20:1 to 300:1. The transferline reactor will have a length to diameter ratio in the range of from about 4:1 to about 20:1.

The speed of conversion in a transferline reactor is very fast, ranging from 0.5 to 10 seconds. Cracked effluent and catalyst pass from line 2 into cyclone 7. In the embodiment shown in the drawing reference numeral 8 designates a reactor-stripper comprising a dense bed of fluidized catalyst 9, a dilute phase or disengaging zone 10 and a stripping zone 11. Cyclone 7 separates catalyst and cracked effluent with the catalyst passing downwardly through dipleg 12 into dense bed 9. Cracked effluent passes through cyclone 13 into line 14 for delivery to a product fractionator 15.

In this embodiment cracking is carried out in a segregated manner. Recycle feed from the fractionator 15, downstream of the cracking unit, is passed by line 16 to riser line 17. Hot regenerated catalyst from lines 4 and 6 is mixed with the recycle feed. Riser line 17 may be of any desired length. In one embodiment from 5 to 50% of the cracking of the recycle feed is accomplished in the riser line 17 and additional cracking is carried out in dense bed 9. Thus, riser line 17 can function in a manner similar to a transferline by maintaining conditions similar to those mentioned for line 2 in line 17. Cracked effluent from riser line 17 and dense bed 9 passes out of reactor 8 via cyclone 13 and line 14 for fractionation and recovery of gas, gasoline, kerosene, heating oil, recycle and bottoms fractions. Catalyst separated from the effluent is returned from cyclone 13 to dense bed 9. Fluid catalyst from the transferline and the dense bed is passed through stripper 11 where it is contacted with steam introduced by line 18.

Stripped catalyst is then passed by line 19 to regenerator 3 for regeneration in the conventional manner.

In one embodiment of the invention a part of the fresh or virgin feed in line 1 can be mixed with recycle feed in line 16 or vice versa by manipulation of valve 20 in line 21 and valve 22 in line 23.

The foregoing description covers an embodiment of combination transferline-dense bed fluid catalytic cracking in the presence of conventional fluidized catalytic cracking catalyst. The operation of this unit is improved and augmented by the adding pure crystalline aluminosilicate zeolite material having an average particle size of less than 10 microns at a suitable location. For example, the pure molecular sieve zeolite can be added by line 24a, 24b, 24c and/or line 24d. Advantages of adding pure molecular sieve by line 24a are that good mixing and heat transfer are achieved with the hot regenerated fluid catalyst entering transferline 2 by line 5 and that the fresh coke free pure sieve catalyst contacts unreacted virgin feed. Line 24b is used to contact segregated recycle feed in line 17 with coke free pure molecular sieve mixed with hot regenerated fluid catalyst in line 6 for mixing and contacting with the feed. In another mode of operation pure molecular sieve is added by line 24c to the partially cracked feed in line 2. The advantage of introducing the second catalyst at a locus near the end of the transferline reactor is that an additional impetus will be given to the cracking reaction at a time when the conventional fluid catalyst has become less active due to coke accumulation. Pure catalyst added to line 5, line 2 or line 6 passes through the cyclones in reactor-stripper 8 and is recovered in line 14 with the cracked effluent from transferline 2 and reactor-stripper 8. Pure catalyst can also be added to line 14 by line 24d. This point of addition has the advantage of contacting after the fluid catalyst has been removed from the cracking effluent. The lower portion of the fractionator comprises a stripping section and most of the pure molecular sieve catalyst is stripped into the heavier fractions. If desired this catalyst can be removed from any of the product fractions by suitable separation means.

EXAMPLE

As a specific example of a transferline catalytic cracking process of the present invention, the following details are given for a unit charging 10M B/D of fresh gas oil and 3M B/D of recycle feed having a boiling range of from about 480° to about 750° F. About 8.5 tons per minute of conventional regenerated rare earth exchanged synthetic faujasite encapsulated in a silica alumina matrix is withdrawn from regenerator 3 by line 4. The fluid catalyst in line 4 has 80% of particles in the range of 40 to 80 microns. By means of a suitable valving arrangement about 6 tons per minute of the conventional cracking catalyst is passed by line 5 into transferline 2 and about 2.5 tons per minute of the conventional catalyst is passed by line 6 into riser 17. About 21 pounds per minute of pure unencapsulated rare earth exchanged synthetic faujasite is added by line 24a to line 5 and thence to line 2 to augment the transferline cracking. The pure zeolite catalyst has 90% of particles in the range of 0 to 10 microns. The cracking effluent and catalysts pass through the transferline in a period of about two seconds. There is some deliberate slippage or back mixing of the fluid catalyst to assure maximum contact with the feed and resultant maximum conversion. With the addition of the pure zeolite catalyst, conversion will be increased.

The process of the present invention is applicable to all types of fluid cracking systems employing one or more transferline cracking zones and/or riser cracking zones. The system may include a dense bed or fluid catalyst of any desired volume to accomplish a minor amount or a substantial amount of the cracking. The pure molecular sieve catalyst can be added to the system at any desired point at which it is advantageous to increase or alter cracking conversion.

The process is attractive from a cost standpoint because a very small amount of catalyst is used to improve the operation of a transferline type fluid cracking unit. Only minor structural alteration of the unit is required to provide means for addition of the pure zeolite catalyst and this applies to units in the design stage as well as to operating units. Feed conversion will be increased with a negligible or very modest increase in the burning function of the regenerator.

What is claimed is:

1. A process for cracking a petroleum hydrocarbon fraction comprising contacting said fraction at cracking conditions in a fluidized cracking zone including at least one transferline cracking reactor, with fluid cracking catalyst having an average particle size of at least 40 microns and augmenting the cracking in said fluidized cracking zone by initially contacting a second catalyst, consisting essentially of a substantially pure unencapsulated crystalline aluminosilicate zeolite material having an average particle size of less than about 10 microns, with a vapor phase portion of said hydrocarbon fraction.

2. Process according to claim 1 in which the second catalyst has an average particle size in the range of .1 to 2 microns.

3. Process according to claim 1 in which the fluid catalyst comprises 5 to 40% of a rare earth exchanged faujasite in a matrix.

4. Process according to claim 1 in which the fluid catalyst is an aluminosilicate cracking clay containing 5 to 40% of the crystalline aluminosilicate zeolite.

5. Process according to claim 1 in which the second catalyst is a crystalline aluminosilicate zeolite material which has been ion exchanged so that it contains cations selected from the group consisting of hydrogen, ammonium, rare earth metals, magnesium, calcium, aluminum, zinc, platinum and palladium.

6. The process of claim 1 wherein said fluid cracking catalyst is selected from the group consisting of amorphous cracking catalyst, crystalline aluminosilicate zeolite physically combined with amorphous catalyst, crystalline aluminosilicate zeolite physically combined with clay, crystalline aluminosilicate zeolite encapsulated with amorphous catalyst and crystalline aluminosilicate zeolite encapsulated with clay.

7. A process for cracking a petroleum hydrocarbon fraction comprising contacting said fraction at cracking conditions in a fluidized cracking zone including catalyst regeneration means and at least one transferline cracking reactor with fluid cracking catalyst having an average particle size of at least 40 microns and augmenting the cracking in said fluidized cracking zone by initially contacting a catalyst mixture consisting essentially of a substantially pure unencapsulated crystalline aluminosilicate zeolite material having an average particle size of less than 10 microns and regenerated fluid cracking catalyst with a vapor phase portion of said hydrocarbon fraction in said transferline reactor.

8. A process for cracking a petroleum hydrocarbon fraction comprising contacting said fraction at cracking conditions in a fluidized cracking zone including at least one transferline cracking reactor having upstream and downstream portions with fluid cracking catalyst having an average particle size of at least 40 microns and augmenting the cracking in said fluidized cracking zone by initially contacting a second catalyst, consisting essentially of a substantially pure unencapsulated crystalline aluminosilicate zeolite material having an average particle size of less than about 10 microns, with a vapor phase portion of said hydrocarbon fraction, said contacting being conducted in a downstream portion of said transferline cracking reactor.

9. A process for cracking a petroleum hydrocarbon fraction comprising contacting said fraction at cracking conditions in a fluidized cracking zone with fluid cracking catalyst having an average particle size of at least 40 microns, said fluidized cracking zone including (a) at least one transferline cracking reactor, (b) a cracking reactor including a dense bed of said fluid cracking catalyst, a reactor-stripper section having a disengaging zone containing a vaporous hydrocarbon mixture, and (c) a riser cracker in communication with said dense bed of said fluid cracking catalyst, and augmenting the cracking in said fluidized cracking zone by initially contacting a second catalyst, consisting essentially of a substantially pure unencapsulated crystalline aluminosilicate zeolite material having an average particle size of less than about 10 microns, with at least a portion of said vaporous hydrocarbon mixture exiting from said disengaging zone of said reactor-stripper.

10. Process according to claim 9 in which segregated fresh feed is cracked in a transferline and cracking effluent is passed into the disengaging zone of a reactor stripper.

11. A process for cracking a petroleum hydrocarbon fraction comprising contacting said fraction at cracking conditions in a fluidized cracking zone with fluid cracking catalyst having an average particle size of at least 40 microns, said fluidized cracking zone including (a) at least one transferline reactor, (b) a cracking reactor including a dense bed of said fluid cracking catalyst, a reactor-stripper section having a disengaging zone containing a vaporous mixture comprising a cracked hydrocarbon component and an unreacted hydrocarbon component, (c) a riser cracker in communication with said dense bed of said fluid cracking catalyst and (d) catalyst regeneration means, withdrawing said vaporous mixture from said disengaging zone and recycling at least a portion of said unreacted hydrocarbon component to said riser cracker wherein a catalyst mixture, consisting essentially of substantially pure unencapsulated crystalline aluminosilicate zeolite materials having an average particle size of less than about 10 microns and regenerated fluid cracking catalyst, is initially contacted with a vapor phase portion of said unreacted hydrocarbon component.

12. The process of claim 11 wherein said recycled hydrocarbon component is cracked in part in said riser cracker and then further cracked in said dense bed of fluid cracking catalyst.

References Cited
UNITED STATES PATENTS

| | | | |
|---|---|---|---|
| 3,380,911 | 4/1968 | Owen | 208—74 |
| 3,140,253 | 7/1964 | Plank et al. | 208—120 |
| 3,368,981 | 2/1968 | Plank et al. | 208—120 X |

DELBERT E. GANTZ, Primary Examiner

U.S. Cl. X.R.

208—74, 164